United States Patent [19]
Greenleigh et al.

[11] Patent Number: 6,085,911
[45] Date of Patent: Jul. 11, 2000

[54] METHOD AND APPARATUS FOR EXTRACTING METALLIC CONTAMINANTS FROM SUBSTRATES

[76] Inventors: Stephen H. Greenleigh, 11217 Empire La., Rockville, Md. 20850; James W. Chester, 92 Rice St., Trucksville, Pa. 18612; Peter L. Rozelle, 21 Dana St., Forty Fort, Pa. 18704; Matthew D. Dewees, 100 Goodleigh Rd., Dallas, Pa. 18612

[21] Appl. No.: 08/908,169

[22] Filed: Aug. 7, 1997

[51] Int. Cl.⁷ .................................. B03B 1/00; C02F 1/42
[52] U.S. Cl. ............................ 209/3; 209/12.1; 210/638; 210/639; 210/669; 210/688
[58] Field of Search ..................... 210/638, 639, 210/651, 665, 669, 682, 688, 694; 209/2, 3, 18, 12.1

[56] References Cited

U.S. PATENT DOCUMENTS

| | | | |
|---|---|---|---|
| 3,773,177 | 11/1973 | Queiser et al. | 210/770 |
| 3,870,033 | 3/1975 | Faylor et al. | 392/470 X |
| 3,962,078 | 6/1976 | Hirs | 210/665 |
| 4,087,375 | 5/1978 | Tanno | 210/682 X |
| 4,166,032 | 8/1979 | Hanway, Jr. et al. | 210/675 |
| 4,189,381 | 2/1980 | Laferty et al. | 210/665 |
| 4,342,650 | 8/1982 | Erickson et al. | 210/606 |
| 5,221,480 | 6/1993 | Schultheis et al. | 210/638 |
| 5,238,663 | 8/1993 | Vikari et al. | 423/139 |
| 5,366,634 | 11/1994 | Vijayan et al. | 210/638 |
| 5,370,827 | 12/1994 | Grant et al. | 588/18 |
| 5,651,894 | 7/1997 | Boyce et al. | 210/638 X |
| 5,695,642 | 12/1997 | Greenleigh et al. | 210/639 X |
| 5,783,084 | 7/1998 | Suenkonis | 423/551 X |

OTHER PUBLICATIONS

United States Statutory Invention Registration No. H1227, Lewis et al., Sep. 7, 1993.

*Primary Examiner*—Tuan N. Nguyen

[57] ABSTRACT

A method for removing metal contaminate from substrate includes four subsystems for removing larger uncontaminated particles by sizing classifying and washing procedures, microfiltration and ion-exchange processing of the overflow stream of water and water-borne contaminants, polishing of the microfiltrate through a bottom-fed clear-well extraction vessel for subsequent return as uncontaminated water and metallurgical furnace processing of the ion-exchange, clear-well extraction vessel polishing and optionally to selectively recover individual metal species from the contaminated flow.

16 Claims, 5 Drawing Sheets

METHOD AND APPARATUS FOR EXTRACTING METALLIC CONTAMINANTS FROM SUBSTRATES

BACKGROUND OF THE INVENTION

The present invention pertains generally to the remediation of substrate contaminated by hazardous material and more particularly to the removal, recovery and processing of radioactive and non-radioactive heavy metallic contaminants from substrates such as soils and wastes.

DISCUSSION OF THE PRIOR ART

As a result of activities of the U.S. and Foreign Governments, and private enterprise, a substantial amount of soil is dangerously contaminated. Contamination resulting from such diverse industries as manufacturing, power generation, mineral extraction, and nuclear weapons production operations has caused extensive environmental impacts to these facilities and their surroundings. Mandates from the U.S. Government including the Comprehensive Environmental Response Compensation and Liability Act (CERCLA) and the Superfund Amendment and Reauthorization Act (SARA) have made contaminated soil a significant economic liability to both governmental and private organizations. Contaminants include heavy metals, organics, and radionuclides occurring individually or as mixed waste.

Removal of heavy metal contaminants represents a major contemporary environmental problem. Heavy metal pollution can leave the affected ground unusable for agricultural or residential purposes, and the metals can eventually leach into the groundwater system and lead to more severe and widespread problems. While a number of soil classification or solidification/stabilization techniques which leave the offending metals in the soil have been developed, only removal of the metals actually definitively solves the problem. Several attempts that effect such a removal of metals from soils have been reported but none has proven fully workable.

These prior attempts have variously included: (1) excavating the contaminated soil and processing it to remove the target ions; (2) providing an impervious covering over the ion contaminated regions, which essentially immobilizes the ion by preventing the intrusion of the groundwater necessary for ion mobility; (3) vitrifying the entire soil strata in-situ by adding a "frit" to the soil and establishing an intense electrical field which turns the soil into a glass-like mass to prevent leaching of the ion; (4) injecting a polymerizable monomer or ion exchange gel into the soil; (5) washing the soil with surfactant chemicals and/or pH adjusters to remove soil contaminants, and returning the cleansed soil; (6) excavating contaminated soil for burial at a remote site; (7) burying the contamination by deep plowing using special machinery; (8) changing the land usage; and (9) thermally processing the soil, e.g., through calcination or incineration. The foregoing methods, however, are regarded as only marginally effective in achieving their goal, namely the return of contaminated land to its original use.

The use of physical and/or chemical separation processes, found in the mineral industries, to concentrate the contamination into a smaller volume of soil, while providing another soil stream that has had the unacceptable levels of contamination removed, can dramatically reduce both the volume and costs associated with site cleanup. These processes, known in some cases as soil washing, possess an extreme drawback in that many are water based and have the potential to create volumes of contaminated water well in excess of the original soil volume.

Prior art water treatment processes to remove undissolved solids include the use of settling tanks, clarifiers, centrifuges, gravity filters and pressure filters. The processed effluent, freed of undissolved solids by methods or a combination of methods using such apparatus, is then further processed to remove dissolved solids, again applying one or more conventional procedures, including precipitation initiated by pH adjustment or reagent addition, flocculation and settling, microfiltration and precipitate concentration through centrifuge or plate press action.

Filter material, depending on the process employed and material removed, can be perforated or slotted metal, or a variety of organic or inorganic fabrics or a variety of beds of materials composed of a variety of sand-like particles. Inorganic adsorbent materials can be used in combination with a filter material to promote solid separation in the flocculation phase. Typically, these materials have been natural low density alkali-metal silicates called zeolites, used to capture positively charged ions of the dissolved solids.

Beds of various kinds of sands are used in a mechanical filtration process called polishing. The contaminated water is passed one or more times through the bed with or without periodic backwashes to flush the entrapped residue upstream for flocculation and/or microfiltration. In a recent stand-alone application, an iron-rich High-Density Inorganic Adsorbent (HDIA) material has been used as the particulate bed and proved effective in a clear-well apparatus to achieve both filtration and ionic capture of dissolved metals.

These known procedures and techniques for separating and removing aqueous based contaminants in aqueous solution greatly reduce the environmental hazards. Unfortunately, however, a high degree of desired effluent purity may require repeated cycling through the individual filtration steps with associated storage volume, time and cost penalties, if such a high level of purity can be achieved at all, and the collected solid concentrate and associated gases pose a continuing environmental problem.

A recently developed method for purifying contaminated water, the subject of a copending and commonly owned U.S. patent application Ser. No. 08/515,222, filed Aug. 15, 1995, entitled "Method for Purifying Contaminated Water", involves sequentially removing undissolved solids using one or more conventional separation techniques, precipitating and removing a large proportion of dissolved solids using one or more conventional separation procedures combined with adsorption treatment with a granulated form of a unique ferrous zeolite high density inorganic adsorbent material to selectively and controllably remove target metal ions, a polishing procedure whereby the processed effluent is filtered upward through a clear well extraction bed of inorganic microporous ferrous HDIA material, and direct processing of separated contaminants through a metallurgical furnace equipped with a gas cleaning apparatus for conversion into processable or easily stored material along with environmentally acceptable releasable gases.

SUMMARY OF THE INVENTION

Accordingly, it is a primary object of the present invention to remediate substrate contaminated with radioactive or non-radioactive metallic materials.

It is a further object of the present invention to purify metallically contaminated substrate while producing a minimum volume of concentrated contaminant and water that is within National Pollution Discharge Elimination System (NPDES) and Federal Clean Water Act guidelines.

It is another object of the present invention to combine soil washing techniques with water polishing processes to minimize the volume of environmentally hazardous residue.

It is yet a further object of the present invention to reduce the cost of remediating metal contaminated soil and waste.

It is another object of the present invention to remediate contaminated substrate by performing off-site recycling of HDIA material to minimize hazardous waste volume.

The aforesaid objects can be achieved individually and in combination and it is not intended that the invention be construed as requiring that two or more of said objects be combined.

In accordance with the present invention, a method for remediating metal contaminated soil comprises sequentially sizing, classifying, precipitating and microfiltering a water-based slurry of entrained substrate to produce clean substrate for drain, rinse and return to the site and a stream of water and metallic contaminants which is passed through a unique zeolite filter for subsequent precipitation, additional microfiltration and dewatering and ultimately to a zeolite clear-well extraction unit and high temperature metal recovery unit or to a metallurgical furnace to yield vitrified slag, benign furnace solids, clean gases and clean water for safe environmental release or recycling.

The foregoing and other objects, features and advantages of the present invention will become apparent upon considering the following detailed description of preferred embodiments thereof, particularly when viewed in connection with the accompanying drawings wherein like reference numerals in various figures are used to designate like components.

DESCRIPTION OF THE PREFERRED EMBODIMENTS

Figure 1:
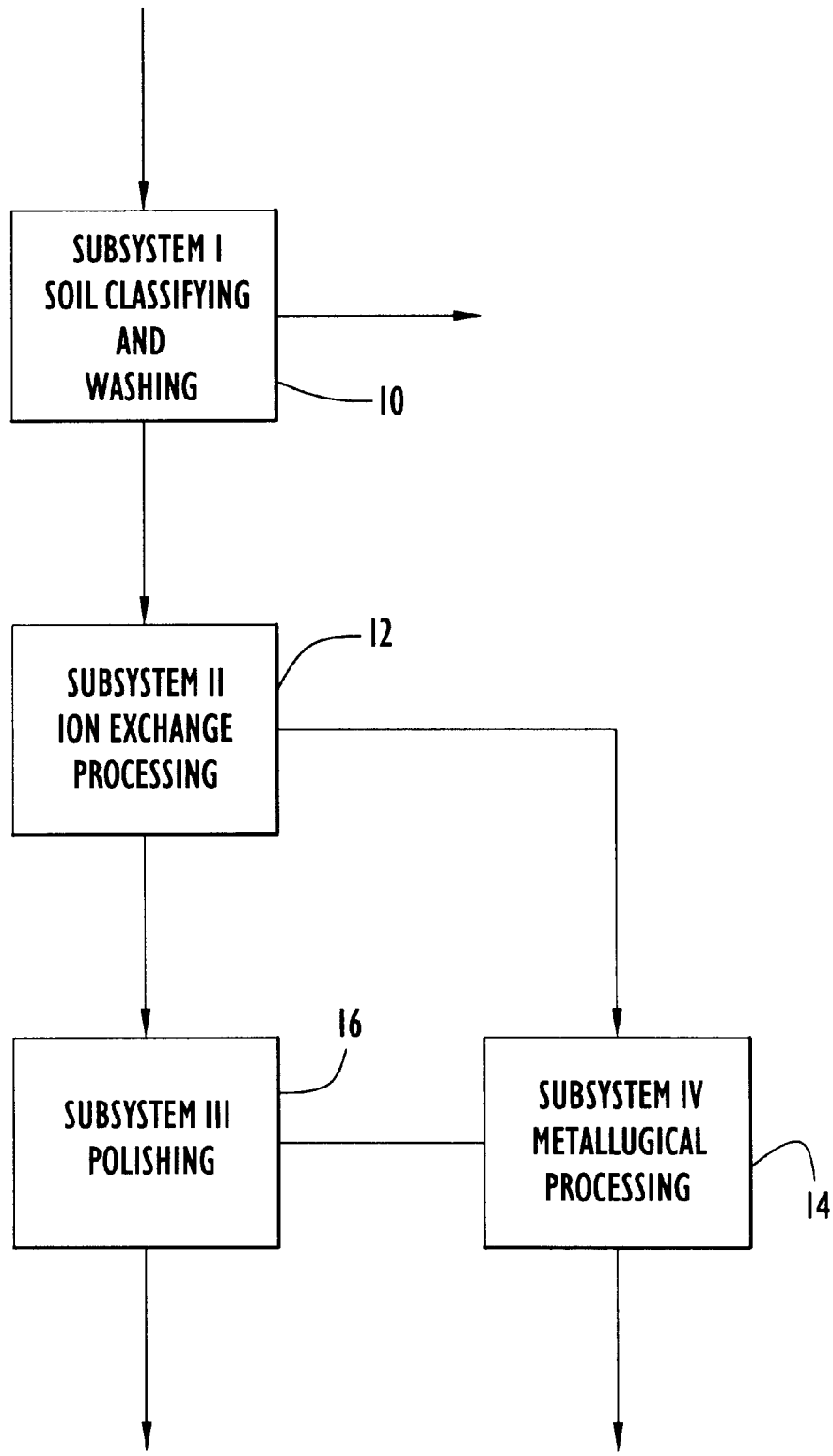
FIG. 1 is a block diagram of subsystem interaction according to the present invention.

Remediation of substrate having metal and metallic compound contamination according to the present invention comprises a soil classifying and washing procedure, ion-exchange processing of the waterborne output through a unique zeolite apparatus, a conventional precipitation process with dewatering, a polishing process to render the system water environmentally safe, and conversion of the solid contaminants into neutral metals and slags by a metallurgical furnace. These procedures, designated Subsystems I through IV, respectively, are shown in block diagram relationship in FIG. 1 and in a more detailed flow diagram in FIG. 2.

Subsystem I, 10, accomplishes the physical separation processing of soils, slags, mill trailings and other substrates. The substrate material is ground, sifted or otherwise sized to a nominal maximum diameter, mixed with water and pumped as a heavy slurry to one or more classifying cyclones or other such devices, to separate the solids by particle size and density into: 1) an overflow stream containing water and solids including the bulk of the contaminant; and 2) an underflow stream including the fraction of substrate from which the higher density contamination has been removed. This underflow material is washed, rinsed and screened to separate and recover process water from the retained solids. The process water is recycled and the cleaned solids are returned to the site as cleaned substrate.

The overflow stream is directed to Subsystem II, 12, where microfiltration separates the bulk of the undissolved solids into a solids-rich stream and a contaminated filtrate stream. The solids are dewatered to further separate the solids from contaminated process water and directed to Subsystem IV. The filtrate stream flows through an on-line contaminant analysis valve where flows having a high contaminant concentration level are directed to a precipitation unit and low concentration flows are directed to one of one or more ion-exchange adsorption units from which sufficiently concentrated contaminant flow is extracted for efficient precipitation. The precipitated flow is directed through an additional microfiltration unit and the solids stream is dewatered and directed, along with the solids from the Subsystem I dewatering, to Subsystem IV, 14.

The solids are processed in Subsystem IV and vitrified in a metallurgical furnace producing environmentally neutral slag and cleaned furnace gases. The concentrated Subsystem II microfiltrate is channeled to Subsystem III, 16.

In the final water treatment, or polishing phase, Subsystem III, the mildly contaminated water is passed upward through a clear-well extraction vessel where a High Density Inorganic Adsorbent (HDIA) material renders the water safe for environmental release. The adsorbed solids are retained in the HDIA which is shipped off-site for either recycling or disposal in a municipal landfill. The polished water can be optionally passed through an activated charcoal filter to further eliminate organic compounds which may be present or the polished water may be released directly to surface waters.

Figure 2:
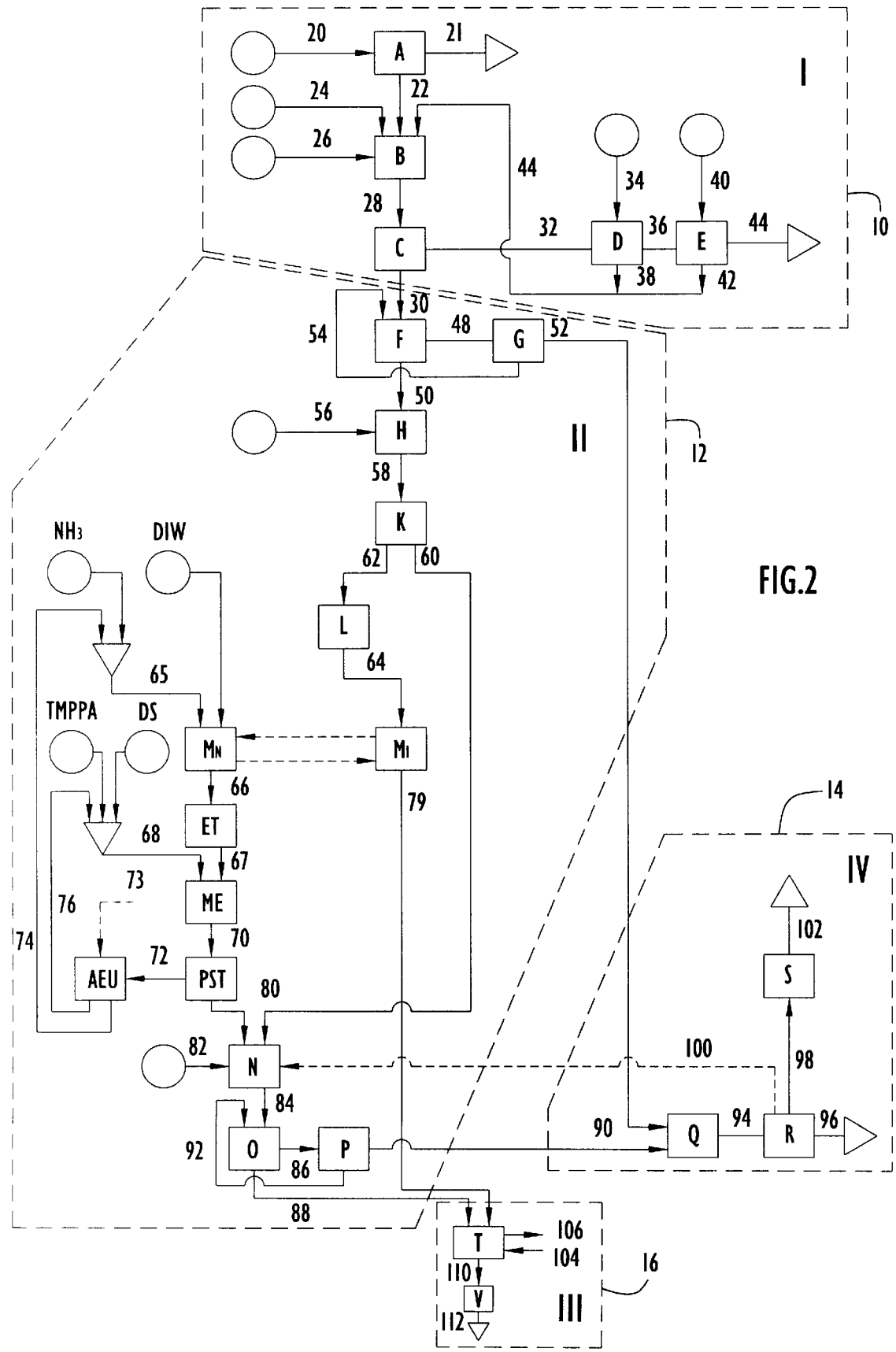
FIG. 2 is a detailed flowchart of process steps and material streams for substrate remediation according to the present invention.

More particularly, a stream of contaminated substrate 20, shown in FIG. 2, enters Subsystem I, 10, and is passed through a sizing unit A comprising, for example, one or more vibrating screens and sieve bands. This unit separates larger particles, the sizes of which are controllable by specifications selected for the screens and sieves, from the finer particles. This step takes advantage of the tendency for contaminants to be concentrated in the finer particles, consequently the larger uncontaminated particles, separated from the stream by sizing unit A, can be returned to the site without further processing as stream 21. The finer particles passing through sizing unit A feed as stream 22 into a centrifugal pump B along with new process water 24 and surfactants 26 as required to pretreat and properly wet the mixture. A portion of the water required at pump B to convert finer particle stream 22 into a pumpable slurry is provided by water stream 44 recycled from subsequent steps as will be described below. Pretreated slurry 28 is pumped into one or more classifying hydrocyclone devices C having a diameter varying from one inch to fifteen inches or more depending on the required cut size. Classifier C separates slurry 28 into a first stream 30, the overflow containing the majority of the contaminants in the form of fine discrete particles such as metals, salts adsorbed by the fine clay matrix of the substrate and dissolved solids solubilized by the process, and a second stream 32, the underflow comprising coarser clean solids in slurry form. This underflow 32 is fed into screen and drain unit D along with a supply of process water 34. The screen and drain unit D comprises one or more stages of vibrating decks and screens. The course overflow drains through the screen depositing the particles on the screen for subsequent rinsing. The passed liquid 38 is returned to centrifugal pump B or to classifier C for reprocessing and the retained particles 36 pass to a rinse unit E where they are washed with clean new or recycled process water 40 and subsequently returned as uncontaminated residue 44 to the environment. The expended wash water 42 is returned along with drain water 38 for reprocessing through pump B or classifier C.

The overflow stream 30 exiting classifier C enters Subsystem II, 12, and is processed through a first microfiltration unit F where larger particles, for instance greater than 0.2 microns, are separated and accumulated to a concentration of about 5–8% solids and subsequently passed as solids-rich stream 48 to a dewatering unit G for separation and drying. The dewatered solids stream 52 comprising about 80–85% solids exiting the dewatering unit is then fed to Subsystem IV, 16 for further processing. The dewatering overflow 54 is reprocessed back to microfilter F for further clarification.

The micro filtrate stream 50 passing through first microfiltration unit F passes to a treatment tank H where surfactants and/or chelator neutralizers and pH adjusting reagents 56 are introduced to bring microfiltrate 58 to a selected pH value between about 3.0 and about 9.5. Neutralization of the chelating effect is necessary to the removal of the dissolved metals from the solution by either precipitation or ion-exchange. This solution passes through an on-line contaminant sensor valve K where heavy metal, radioactivity and/or a total suspended solids (TSS) concentration of the stream is sensed, for instance by electroconductivity and/or light transmitting measurement, and the stream is directed in one of two directions based on this sensed concentration level. When a concentration level above a preselected value is sensed, for instance having a heavy metal concentration greater than 50 mg/l, a radioactivity greater than 20 PC or a TSS level greater than 5 mg/l, this concentrated flow is directed as stream 60 directly to precipitation unit N inasmuch as precipitation affords better economy and efficiency at these higher concentration levels. Alternatively, this flow may contain concentrations of one or more commercially valuable metals. In this case flow 60 will be processed through an additional process, Selective Metal Extraction (SME), that will be discussed subsequently. When lower concentrations are sensed at valve K the flow is directed as stream 62 to a switching valve L for allocation to one of a bank of two or more parallel ion-exchange adsorption systems to effect sufficient additional contaminant concentration to support efficient subsequent precipitation.

The on-line dilute stream 64 directed by switching valve L passes through one or more of a plurality of parallel ion-exchange adsorption vessels $M_1$ having a bed of High Density Inorganic Adsorbent (HDIA) material, preferably FE40* to be discussed below. The HDIA material adsorbs heavy metals from the stream which continues as treated stream 79 to the polishing unit T of Subsystem III, 16, for polishing and final decontamination.

As the HDIA material in the on-line adsorption vessel approaches metal saturation as determined, for example, by a pH sensor in the on-line vessel, switching valve L redirects the flow to an alternative one of the parallel adsorption units for continuous processing while the saturated vessel undergoes regeneration. A measurement of pH 8.5 will be the typical lower limit for effective operation of the adsorption vessel. A regenerative solution 65 of, for example 5% aqueous ammonia $NH_3$, is flowed through the saturated HDIA material in the now-off-line adsorption vessel $M_n$ to dissolve the adsorbed heavy metals. This flow is applied until the metals concentration in the stream is reduced by 95% or until the concentration becomes asymptotic. The HDIA bed is then given multiple rinses with deionized or distilled water, DIW, to remove residual $NH_3$ from the bed. The regenerative solution and rinse water 66 is collected in an Equalization Tank ET which serves as a holding tank or reservoir for the contaminant solution. The regenerated adsorption vessel $M_n$ is now available to be returned to on-line service and the volume of contaminant solution in the Equalization Tank continues to increase as subsequent adsorption vessels are regenerated until a cost-effective or efficient volume is accumulated. A mixture of a reagent, for example $d_i$-2,4,4 trimethylphenylphosphic acid (TMPPA) and a diluent DI, for example undecane, forming a liquid organic cationic extractant (LOCATEX) 68 is mixed with the contaminant 67 from the equalization tank in a metals extractor ME to produce an extractant mixture 70 which is collected in a Phase Separation Tank PST where separation is allowed to occur. The heavier aqueous phase stream 80 is flowed to precipitation unit N and the stream of lighter organic substances 72 is flowed into an Ammonia Extraction Unit AEU. Heat 73 in the form of steam, for example, a waste-heat byproduct of subsequent solids preparation operations, is used to drive off the ammonia as a gas which is returned as flow 74 for subsequent mixture with deionized or distilled water to a 5% ammonia concentration to be recycled as the regenerative solution 65. The remaining LOCATEX 76, essentially stripped of ammonia, is processed by mixture with TMPPA or dilutents, as required, to be recycled as extractant reagent 68.

The concentrated contaminant microfiltrate 80, now ammonia-free and metal-rich, is directed, along with concentrated stream 60 as measured by sensor valve K into a standard precipitation unit N. Stream 60 treated with one or more precipitation reagents 82 comprising, for instance, combinations of calcium oxide, calcium hydroxide and calcium carbonate, and waste heat 100 produced as a byproduct of the ammonia recovery process or the metallurgical furnace of Subsystem IV, 14. The output of the precipitation unit N, a metal hydroxide precipitate slurry 84 flows into a second standard microfiltration unit O. Particles larger than about 0.2 microns are filtered and directed as a solid-rich stream 86 to a second dewatering unit P for concentration into a cake containing no more than 20% moisture which is sent on to the solids preparation unit Q of Subsystem IV. The remaining microfiltrate 88 flows into a polishing unit T in Subsystem III along with the treated stream 79 from on-line adsorption unit $M_n$. Polishing is accomplished by passage through an extraction vessel containing microporous inorganic filter media, for example a unique FE40* clear well extraction unit T, that will be described in detail subsequently. The extraction vessel adsorbs the remaining contaminants to produce clean water for optional hydrocarbon filtering through, for instance, an activated carbon filter V, and subsequently for discharge 112, back into the environment. The spent adsorbents 106 of the extraction vessel are transferred to a an off-site metal recovery facility U for rejuvenation and consequently can be recycled back 104 to the clear well unit for reuse.

Figure 3:
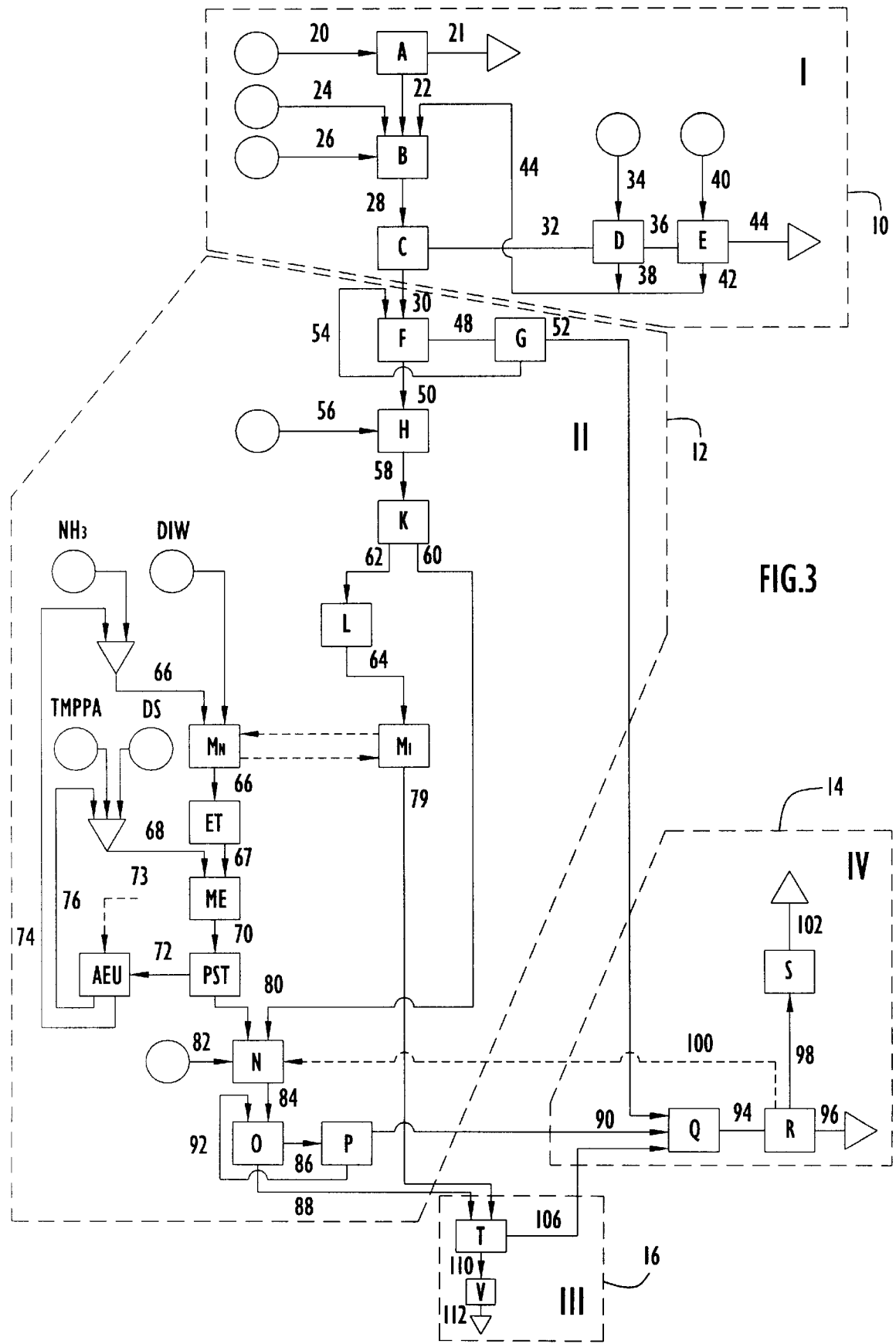
FIG. 3 if a flowchart of radioactively contaminated soil remediation according to the present invention.

The concentrated solid contaminants from both the Subsystem I and Subsystem II dewatering units G and P respectively, are delivered to Subsystem IV via flows 52 and 90, respectively, to a solids preparation unit Q and hence via flow 94 to a metallurgical furnace R for conversion into environmentally safe vitrified slag 96 and gases 98. The gases 98 pass through a conventional gas cleaning unit S before safe atmospheric release 102.

Where significant concentrations of radioactivity are present in the input substrate, the spent adsorbents 106 are transferred to the furnace R for vitrification as shown in FIG. 3 rather than rejuvenation.

In a preferred embodiment, the High Density Inorganic Adsorbent (HDIA) material of choice is an iron-rich compound previously available as ECOSORB from Horsehead Resource Development, Inc. of Palmerton, Pa., and now marketed as powdered or granular zeolite FE40* by Environmental Management Associates of Trucksville, Pa.

The iron-rich material FE40* is produced in a reducing atmosphere Waelz Kiln as a coproduct of the processing of Electric Arc Furnace (EAF) dust, rich in iron, zinc, lead and cadmium.

The general physical and chemical characteristics of the FE40* material are shown in Tables 1 and 2, respectively, below.

TABLE 1

REPRESENTATIVE PHYSICAL PROPERTIES OF FE40*

| | |
|---|---|
| Surface Area | 9.7 ml/g |
| Pore Volume | 25% |
| Median Pore Size | 4μ |
| Void Volume | 41.2% |
| Bulk Density | 1.49 g/cc |

TABLE 2

REPRESENTATIVE COMPOSITION OF FE40*

| Element | Weight % |
|---|---|
| Fe | 28.2 |
| Ca | 10.7 |
| Mg | 2.6 |
| Si | 8.4 |
| Zn | 4.2 |
| Mn | 3.6 |
| Al | 3.6 |
| Pb | 0.18 |
| Cu | 0.62 |
| Ni | 0.12 |
| Ti | 0.17 |
| Cr | 0.31 |
| Na | 0.55 |
| K | 0.31 |

The values shown in the tables are approximate and representative of typical reducing atmosphere Waelz Kiln iron-rich material (IRM) output, however variations in EAF input materials and processing produce a range of chemical proportions. The material supports the precipitation process by releasing hydroxyl ions to very slowly neutralize acidity and thus produce and maintain an elevated pH level which facilitates the dissolved metal extraction process of HDIA.

This material exhibits the characteristic of raising the pH value of host water to levels higher than those associated with the maximum precipitation of metal hydroxide contaminants. As a result, those particles of metal hydroxides sufficiently small to elude practical flocculation are forced again into solution, where extraction is effected by ionic capture within the HDIA.

The FE40* material has a median pore size of four microns. Some are smaller. Some are larger. Particles that are smaller than those pores become trapped placing them in close proximity to the capture-surface of the material. Each grain of FE40* performs the inherent function of pH modification. The pH within each grain is 9.5, or higher. This provides a very strong driving force for most metal hydroxides to go into solution and to be subsequently captured by FE40*. Metal removal is achieved during the flocculation process. The overall effect is therefore greater metal removal than can be achieved by the flocculating agent alone.

A unique feature distinguishing FE40* from other available HDIA material or zeolites comes into play when it is applied in carefully measured and limited amounts of powdered or granular form to an aqueous solution of dissolved metals. The FE40* material makes a limited number of capture locations available to a much larger number of metal candidates. This causes a strong competition amongst the metals present in the solution for those capture sites, in turn initiating a highly competitive process. The competition amongst metal ion species favors those with greater attractive ionic energy levels and results is a highly selective extraction process. Over 90% of the ions of the metal species having the highest energy level before those of the next most energetic species would begin to be adsorbed. This is in sharp contrast to other similar materials that generally perform a broad-band adsorption of the spectrum of available metal ions without species discrimination (for FE40* to exhibit broad-band adsorption characteristics it must be applied in a fashion equivalent to a fixed bed). The FE40* can therefore be used, in sequential measured applications, to target a given metal independent of the other metals present in the solution.

Figure 4:
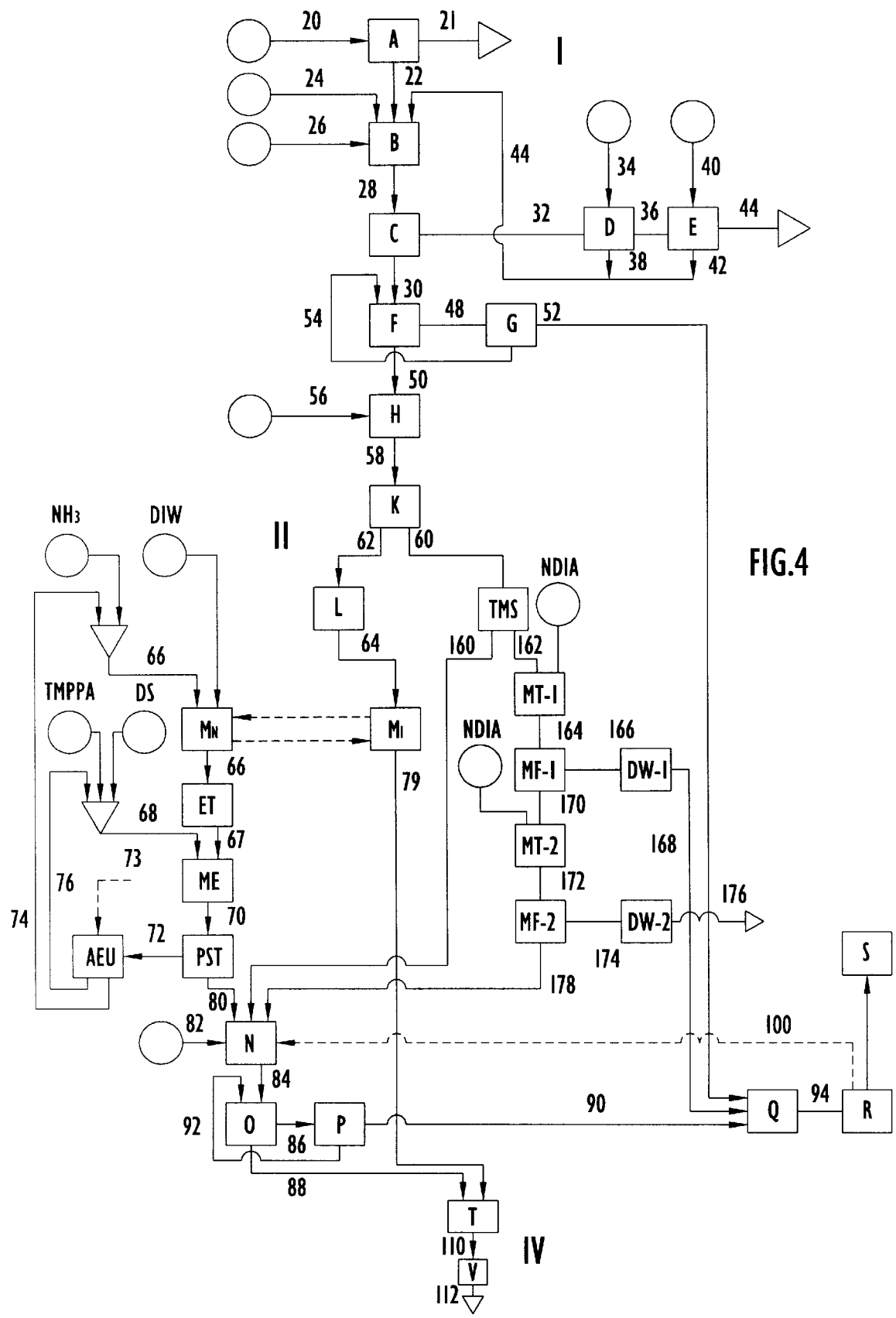
FIG. 4 is a detailed flowchart of soil remediation incorporating selective metal extraction in subsystem II.

This is the principle of the Selective Metal Extraction Process (SMEP) shown in FIG. 4. Selective Metal Extraction utilizes the addition of HDIA in limited quantities to force the removal of metals in an established sequence. That sequence is based on the relative affinities of the metals present in a given solution of the HDIA. For example, in a mixture including zinc, cadmium, lead, copper and nickel, the addition of powdered FE40* would result in removal of approximately 99% of the lead ions, the most ionically active of the available species, before the next most energetic, copper, would be affected. Similarly virtually all of the copper ions would be adsorbed before those of nickel, then cadmium, then zinc.

Selective removal of metals in a given solution is achieved by forcing the metals to compete with each other for access to the HDIA capture sites. The approach to separation can be either to capture the target metal, or to leave that target metal in solution. There are processing advantages to both approaches. The SMEP uses the approach of HDIA-capture of the target metal. The process is a two-step application of HDIA to place the target metal at the top of the affinity hierarchy.

The concentrated flow 60 as determined by sensor valve K is passed through a target metal sensing instrument TMS of any conventional design to measure the concentration level of the targeted metal. Such measurements generally entail a measurement of electrical conductivity of the metal species contaminated water. If commercially insignificant concentrations are detected, the otherwise concentrated stream 160 is flowed directly to the precipitation unit N. If commercially viable amounts are present, the flow 162 is collected in mixing tank MT and granular or powdered HDIA, preferably FE40*, is applied incrementally to effect ionic capture of all metal ion species having a higher capture ions of the energy than the one targeted. The mixture 164 is then passed through a first microfilter MF-1 where the HDIA and captured metal material 166 is separated and flowed to a first dewatering unit DW-1 for concentration and subsequent flow 168 to the metallurgical furnace of Subsystem IV. The microfiltrate 170, now having the targeted metal as the most energetic ion, is collected in a second mixing tank MF-2 and an amount of the powdered or granular HDIA is applied sufficient to capture the ions of the target metal but insufficient for capture of the next most active species. This mixture 172 is passed through a second microfilter MF-2 to remove the targeted metal captured in the HDIA 174 which flows into a last dewatering unit DW-2 for concentration. The output 176 is then separated target metal ready for subsequent processing. The microfiltrate 178 can then be treated with further additions HDIA or can be processing flowed directly to precipitation unit N.

Uniquely, metal capture by FE40* can be recovered with 98% efficiency by taking advantage of the magnetic properties of FE40*. This allows the material to be managed in a flowing system by the selective application of a magnetic field, or a series of magnetic fields, offering new possibilities for solutions containing a precious metal, radioactivity, or a metal of high toxicity such as mercury, or any metal of predetermined significance. Electromagnetic fields can be used to separate the FE40* material along with the captured metals from the mixture as a potentially economy and efficiency enhancing improvement over the use of microfilters.

Figure 5:
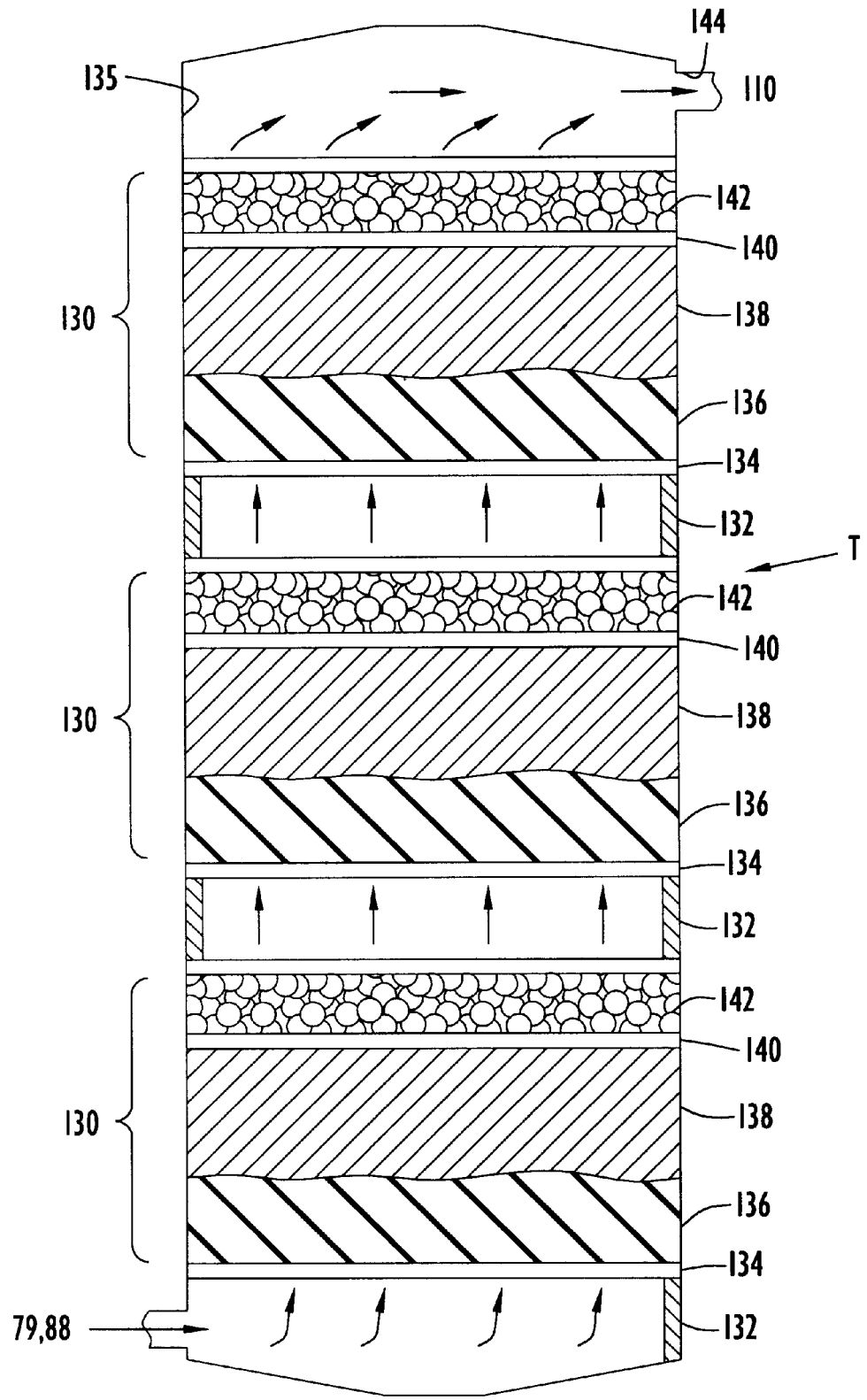
FIG. 5 is a view in cross-section of a clear-well extraction vessel used in subsystem III of the present invention.

A clear-well bottom-fed filter extraction vessel 120 used in the polishing procedure of Subsystem III is shown in FIG. 5. In a preferred embodiment each extraction vessel 120 contains multiple filter stacks 130 each containing sequential layers of a peripheral support bushing 132, a perforated plate 134, crushed stone 136, FE40* adsorbent 138, an expanded metal disc 140 and stirring spheres 142, which, as viewed from the bottom up, are layered over the full cross-section of an open vessel.

Bushing 132 extends around the perimeter of vessel 120, supporting plate 134 and prevents the upwardly rising fluid from following streamlined or laminar flow along the vessel wall 135. Distribution plate 134, about one-quarter inch thick and preferably made of either 304 stainless steel or PVC 40 plastic, is cemented to the vessel perimeter and has perforations not greater than ¼ inch in diameter formed therein. A layer of crushed stone 136 preferably sized at minus ½-inch plus ¼-inch rests atop plate 134 and is about two inches in depth to provide a bed for the finely grained material above. An adsorbent layer 138 of FE40* adsorbent media preferably between four and eleven inches in depth rests atop the crushed stone and is covered by an adjacent expanded metal disc 140 fitted tightly against the vessel perimeter. A layer of stirring spheres 142, of the sort marketed as Tri-Paks by Jaeger Products, Inc. of Houston, Tex. is placed atop expanded metal disc 140 to a depth of at least two inches. The diameters of the stirring spheres, used to enhance the mixing and redistribution of the flow of rising fluid between successive adjacent filter stacks, can vary up to one or two inches. A retaining plate of expanded metal may optionally be used to constrain the buoyant stirring spheres or they may alternatively be allowed to rise to the underside of the distribution plate associated with the subsequent filter stack.

Three such filter stacks comprise one embodiment of a clear-well extraction vessel according to the present invention, however the present invention envisions the use of one or more filter stacks to achieve varying degrees of separation. Effluent is introduced into the open volume beneath the first (lowest) perforated distribution plate 134 and rises up through the various levels to be discharged through an outlet pipe 144 above the uppermost filter stack 130. The clear-well upward movement of the water through the filters provides two important advantages over conventional downward feed systems: residence time of the water within the extraction media can be more easily controlled in gravity operations; and inefficient short-path channeling of the water through the medium is minimized. The distribution plates provide support for each segment of the treatment bed and also provide additional management of the cross-sectional flow profile of the water being treated through the number and arrangement of the perforations. The value of such an entry is that the incoming water does not immediately encounter the treatment media, FE40*, until the water has completely filled the cross-section of the vessel and can therefor be more evenly distributed across the full area of the extraction bed. This positioning avoids the situation of top-fed water having to distribute itself over the cross-section of the extraction body by a tortuous least resistive path through the voids of the treatment bed. Such labored distribution, when top-fed, requires the water to move back and forth in the same area of the treatment bed subjecting the calcium compounds in the treatment media to a soaking action resulting in a leaching of those compounds accumulating on the bottom of the vessel. This deposition also occurs in the interstices of the treatment media and contributes to the solidification, and ultimate occlusion of the bed.

The polishing step is a cation capture that is facilitated by the infusion of hydroxyl ions by the FE40* adsorbent media, the high-density inorganic adsorbent material described previously. The adsorption mechanics are along the typical lines of inclusion of ionic species into the molecular matrix of adsorbent materials. However, this is made to happen by interference with the formation process of metal hydroxides. FE40* has the inherent ability to bring the pH of the solution containing the targeted metal to the optimum point for precipitation of its hydroxide. This infusion of hydroxyl ions can be sustained for great lengths of time thus holding the pH at the critical point even with the addition of incoming solution carrying a lower pH. In order for the target metal ion to form the hydroxide it must lose kinetic energy or movement in the solution. While this loss of energy enhances formation of the hydroxide, it also makes the metal-ion susceptible to the bonding forces of the metal matrix of the material itself. The bonding forces consistently prevail. The result is an ionic extraction of the metals from the solution in a manner typical of ion-exchange materials. Further, the metals removed can be selected by controlling the pH of the solution while it is in contact with FE40*. This control is obtained by regulating the residence time of the solution in contact with the material and using clear-well vessels in a detached, or irreversible flow, sequence. This means that solutions in each vessel are not connected hydraulically. Processing rates are typically designed by the flow rate in a ratio with the weight of the contact bed.

The acknowledged rule for material in motion is that it will seek the path of least resistance. In packed columns, this is called channeling. It defeats the purpose of keeping the flowing material in contact with the bed as long as possible. By reversing the flow of the water from downward flow to upward, advantage is taken of the effect of gravity. The pull of gravity is made to be the path of least resistance within the system.

Flow into the extraction vessel is metered to control upward flow through the vessel and consequently to optimize the residence time of the flow in the extraction media. This control on the linear velocity also minimizes channeling both along the walls of the vessel (a favored path because of the smooth surface of the wall offering little resistance), and through the larger spaces in the body of the bed. The bushing located beneath each perforated plate blocks the holes closest to the wall of the cylinder to reduce the tendency toward vessel wall channeling.

The repetition of the clear-well segments further defeats channeling or short-circuiting of the flow of the water through the vessel by forcing the water to redistribute itself over the cross-section of the extraction bed between successive segments. This further maximizes the time spent by the water in contact with the extraction media. The stirring spheres provide mixing of the water as it is being redistributed over the cross-section of the extraction media and the open space following the stirring spheres forces turbulence to subside permitting entry into the next segment of the extraction bed as quietly as possible.

The FE40* High Density Inorganic Adsorbent material finds potential application in three separate processes of the present invention: to concentrate microfiltrate to levels suitable for precipitation in Subsystem II; to optionally selectively recover specific metal species in the Selective Metal Extraction process also in Subsystem II; and as the active polishing agent in the clear-well extraction vessels of Subsystem III.

The present invention provides a set of sequential operations supported by a combination of conventional and uniquely new units of apparatus to provide an overall method for flexibly remediating substrate containing a wide range of radioactive and non-radioactive contaminants while providing a minimum volume of hazardous residue. The method can be practiced in situ to minimize transport dangers and expenses and metals of commercial value can be individually recovered to further mitigate remediation costs.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method for removing metal contaminants from substrate comprising the steps of:
   (a) mixing the substrate with water to form a pumpable slurry;
   (b) separating large uncontaminated particles from the slurry by classification and washing for return as uncontaminated substrate;
   (c) microfiltering said remaining step (b) slurry to produce a first concentrated solids-rich stream for passage to a metallurgical furnace for further processing and a first microfiltrate stream;
   (d) concentrating, precipitating and microfiltering said first microfiltrate stream to produce a second concentrated solids-rich stream for passage to said metallurgical furnace for further processing and a second microfiltrate stream;
   (e) polishing said second micro filtrate stream by flowing through an extraction vessel containing microporous inorganic filter media for adsorbing metal cations from said second microfiltrate stream; and
   (f) discharging said polished step (e) stream back into the environment as uncontaminating water.

2. The method for removing metal contaminants from substrate of claim 1 wherein said step (d) concentration is performed by passing said first microfiltrate stream through one or more vessels containing high density ion-exchange adsorption material (HDIA) to remove metal contaminants from said stream, said treated stream is flowed to said step (e) extraction vessel, and said HDIA material, upon saturation, is reconstituted to produce regenerated HDIA material and a contaminant-concentrated microfiltrate for passage to a precipitation unit.

3. The method for removing metal contaminants from substrate of claim 2 wherein said saturated HDIA material is reconstituted by dissolving the adsorbed metal contaminants from the HDIA with aqueous ammonia, rinsing the HDIA with deionized or distilled water, collecting said aqueous ammonia and water in a tank, treating the resultant solution of metal contaminants, aqueous ammonia and water in said tank with a dilute reagent to produce an extraction mixture for separation into a heavier aqueous stream flowed to a precipitation unit and a lighter organic stream is flowed to an ammonia extraction unit for recovery of ammonia.

4. The method for removing metal contaminants from substrate of claim 2 wherein said HDIA material is iron-rich microporous inorganic material produced in a reducing atmosphere Waelz Kiln processing of Electric Arc Furnace dust.

5. The method for removing metal contaminants from substrate of claim 2 wherein said HDIA has the physical properties shown in Table 1 and the chemical composition shown in Table 2.

6. The method for removing metal contaminants from substrate of claim 5 wherein said step (e) microporous inorganic filter media is iron-rich microporous material produced in a reducing temperature Waelz Kiln processing of Electric Arc Furnace dust.

7. The method for removing metal contaminants from substrate of claim 5 wherein said step (e) microporous inorganic filter media has the physical properties shown in Table 1 and the chemical composition shown in Table 2.

8. The method for removing metal contaminants from substrate of claim 1 further comprising the step:
   (e.1) flowing said step (e) polished stream through an activated carbon filter to remove organic compounds.

9. The method for removing metal contaminants from substrate of claim 1 wherein said step (e) extraction vessel is a bottom-fed clear well extraction vessel.

10. The method for removing metal contaminants from substrate of claim 1 further comprising the step:
    (c.1) passing said first microfiltrate stream through a concentration sensor;
    (c.2) directing said first microfiltrate streams having a concentration higher than a predetermined level directly to a precipitation unit;
    (c.3) directing said first microfiltrate streams having a concentration lower than a predetermined level to a concentration unit.

11. The method for removing metal contaminants from substrate of claim 10 wherein said concentration sensor measures electroconductivity of said first microfiltrate stream.

12. The method for removing metal contaminants from substrate of claim 10 wherein said predetermined concentration level is 50 mg/l of heavy metal.

13. The method for removing metal contaminants from substrate of claim 10 wherein said predetermined concentration level is 30 PC of radioactivity.

14. The method for removing metal contaminants from substrate of claim 10 wherein said predetermined concentration level is 5 mg/l of total suspended solids.

15. The method of claim 3 wherein said dilute reagent is $d_r$-2,4,4 trimethylphenylphosphic acid (TMPPA) mixed with undecane.

16. A method for removing metal contaminants from substrate comprising the steps of:

(a) separating larger uncontaminated particles from the substrate;

(b) flowing the remaining smaller-particle substrate, clean process water, and surfactants into a centrifugal pump to produce a pumpable slurry;

(c) pump said step (b) slurry into one or more classifier units for separating into an overflow stream containing the majority of discrete particle contaminants and dissolved solids and an underflow comprising a slurry of coarse clean solids;

(d) flowing said underflow of coarse clean solids slurry and process water into a screen and drain unit for separating solids from said slurry;

(e) passing said step (d) solids to a rinse unit for washing with clean process water to produce clean uncontaminated residue;

(f) flowing said step (c) overflow into a first microfiltration unit for separation into a solids-rich stream and a micro filtrate stream;

(g) flowing said step (f) solids-rich stream into a dewatering unit for concentration;

(h) flowing said step (f) filtrate stream, surfactants, neutralizers and pH adjusting reagents into a treatment tank to produce a microfiltrate stream having a pH value between 3.0 and 9.5;

(i) flowing said step (h) treated microfiltrate stream through a contaminant sensing valve for directing flow having a level of contamination above a predetermined level to a precipitation unit and directing flow having a contamination level below said predetermined level to a switching valve for subsequent routing to a first one of a plurality of ion exchange adsorption vessels used alternatingly;

(j) flowing said step (i) flow having a contamination below said predetermined level through one of the said plurality of ion exchange adsorption vessels and on as a treated stream to a polishing unit until said adsorption vessel begins to approach saturation;

(k) upon determination of approaching saturation of said adsorption vessel, redirecting said step (i) flow having a contamination below said predetermined level to another of said plurality of ion exchange adsorption vessels via said step (i) switching valve;

(l) reconstituting said saturated adsorption vessel to produce a reconstituted vessel for subsequent alternating reuse, and a stream of concentrated contaminant microfiltrate; while maintaining continuous adsorption treatment via said alternatingly employed plurality of vessels;

(m) flowing said step (l) concentrated microfiltrate stream, said step (i) flow having a contamination above said predetermined level and precipitation reagents into a precipitation unit to produce a metal hydroxide precipitate slurry;

(n) flowing said step (m) precipitate slurry into a second microfiltration unit for separation into a solids-rich stream and a microfiltrate stream;

(o) flowing said step (n) solids-rich stream into a second dewatering unit for concentration;

(p) flowing said step (n) microfiltrate stream and said step (j) treated stream to a cationic adsorption polishing unit to produce clean water and recyclable spent adsorbents;

(q) flowing said step (o) concentrated stream and said step (g) concentrated stream to a solids preparation unit;

(r) passing said prepared solids into a metallurgical furnace for producing environmentally benign vitrified slag and furnace gases; and (s) passing said furnace gases through a gas cleaning unit for treatment and atmospheric release.

* * * * *